March 10, 1953 — M. R. SULLIVAN ET AL — 2,631,189
STATIC WICK DISCHARGER
Filed Jan. 27, 1950
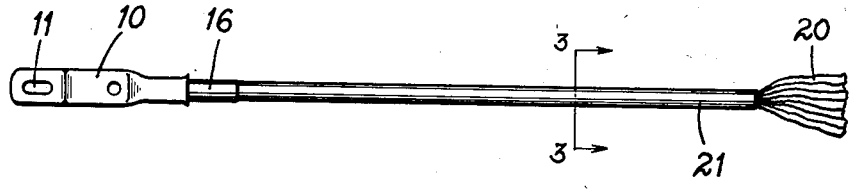
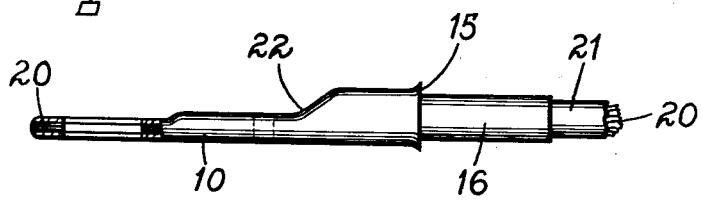
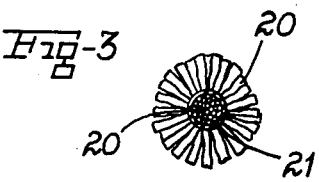
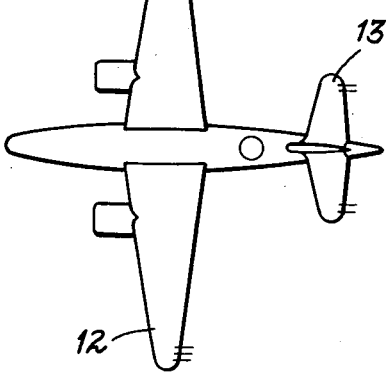
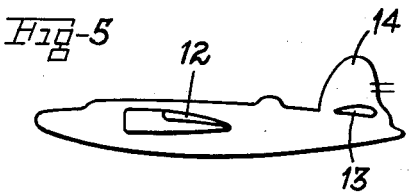
INVENTORS
MARY R. SULLIVAN &
GEORGE W. HOUK, DECEASED
BY FRANCES RUDY HOUK, ADMINISTRATIX, W.W.A.
AND NELSON S. TALBOTT, ADMINISTRATOR, W.W.A.
By Marechal & Biebel
ATTORNEYS Patented Mar. 10, 1953

2,631,189

UNITED STATES PATENT OFFICE 2,631,189

STATIC WICK DISCHARGER

Mary R. Sullivan, Dayton, Ohio, and George W. Houk, deceased, late of Dayton, Ohio; Frances Rudy Houk and Nelson S. Talbott, administrators, Dayton, Ohio, assignors, by direct and mesne assignments, to Dayton Aircraft Products, Inc., Dayton, Ohio, a corporation of Ohio Application January 27, 1950, Serial No. 140,844

8 Claims. (Cl. 175—264)

This invention relates to static wick dischargers for aircraft and the like.

It is known that static electricity has a tendency to form and collect upon an aircraft in that unless properly dissipated, such static may flight, particularly higher speed aircraft, and materially interfere with the proper operation of the radio and electronic equipment on the aircraft. The static may be discharged by trailing a fabric or cotton wicking containing a high resistance coating, such wicks providing a large number of discharge points of small dimensions and having the capacity to cause a charge to dissipate into the surrounding air in flight, thus preventing the building up of such highly charged conditions as to cause the objectionable interference referred to. Where such wicking has been prepared by impregnating the fabric with a powdered metal such as silver, for example, not only has the process of forming the wicking been substantially involved and relatively expensive, but under the severe conditions to which the wicking is subjected in its exposure to the relative wind in flight, there has been excessive wear, abrasion and change in the resistance characteristics, causing the wicking to lose its effectiveness rapidly. Whether the loss of effectiveness is caused by the washing or leaching out of the silver or other metal, or as a result of oxidation of the metal, the result has been that the wicking would change its essential characteristics quite rapidly, and thus soon become of little value for the purpose. Attempts to substitute other conductive materials have not been successful because of the difficulties presented in securing such materials sufficiently firmly to the wicking to provide the proper initial resistance and to maintain the materials in place and with any substantial uniformity of characteristics under the severe conditions of use.

In accordance with the present invention a superior static discharge wick is provided which can be reliably and economically produced with desired resistance characteristics as determined to be most satisfactory, and such characteristics are maintained in a highly reliable manner over an extended period of use, notwithstanding the severe abrasion, leaching, and other conditions to which the wick is subjected in flight. This is accomplished through the utilization of carbon in finely divided form as the high resistance conductor, the carbon being applied in the form of a dispersion of graphite, and being secured to the wicking in a highly permanent manner through the use of a suitable resin binder composition. Wicks so produced as to have a predetermined resistance may be prepared relatively inexpensively, and may be used even under severe conditions of flight through rain, snow, fog and the like, and have been found to maintain their effectiveness and do not objectionably depart from the desired value of resistance, over substantially longer periods than has been possible with metal impregnated wicks.

It is accordingly the principal object of the invention to provide a static wick discharger and a method of producing the same economically which makes use of a dispersion of graphite suitably applied and bonded to the cotton wicking to produce a reliable and maintainable high resistance capable of withstanding the severe conditions encountered when the wick is carried by the wing or other exposed part of the aircraft in flight, thereby providing a reliable static discharger which effectively reduces or prevents interference with the radio and other electronic equipment of the aircraft.

Other objects and advantages will be apparent from the following description, the appended claims and the drawings.

In the drawings—

Fig. 1 is a view in plan of a typical form of static wick discharger in accordance with the present invention;

Fig. 2 is a view of the attaching end of the wick on a somewhat larger scale;

Fig. 3 is a section through the wick on the line 3—3 of Fig. 1; and

Figs. 4 and 5 are a plan and a side elevational view respectively of an aircraft showing typical applications of the static wick discharger of the present invention thereto.

Referring to the drawings which disclose a preferred embodiment of the invention, the wick discharger is shown as comprising a metallic fitting 10 having an attaching slot 11 by means of which it can be secured to a part of the aircraft on which the static is known to collect, usually the outer trailing edge of a wing 12, the stabilizer 13, or the vertical rudder 14. Usually the static accumulates and builds up the greatest potential on the extremity of a surface where there is a sharply defined surface such as a trailing edge, and it is on these areas that one or more of the dischargers are conveniently attached. The fitting 10 is provided with an open end 15 in which a plastic sleeve 16 is received with the actual cotton fabric material being shown at 20, the major portion of the length of which is encased in a similar plastic sleeve

21 to prevent excessive whipping and fraying. This assembly is clamped in the end of the fitting as shown at 22 and the forward ends of the wicking are connected electrically by being brought into direct contact with the fitting so that the static charge is conveyed from the aircraft surface directly to the wicking itself.

The entire length of the wicking is treated to render it conducting, and it has been found that the most satisfactory results are secured where the overall resistance of the wick is of the order of about 100,000 ohms. It is highly important, however, that the wick have such characteristics that not only can the resistance be predetermined to be within a desired range, but that such resistance will be substantially maintained in use, notwithstanding the severe conditions to which the wick is subjected as it travels through the relative wind at high speed.

The mixture for impregnating the wicking includes finely divided carbon such as colloidal carbon, a convenient form thereof being an aqueous dispersion of graphite, such as the Acheson aquadag material. This colloidal graphite material has been found to have particle size and "work function" characteristics, i. e., the ability of the carbon material to give up its electronic charge, which are desirable for the present application. It has been found desirable however to prepare the wicking within a relatively short time after the opening of the containers of the aquadag, that is, a period measured in terms of several days, preferably keeping the preparation and treatment of the materials within a period of not substantially more than a week.

The finely dispersed graphite is mixed with a resin which is of such character that it is water soluble as initially mixed but is capable of being cured into a water insoluble resin so as to bond and securely retain the carbon in position on the wicking during the use of the latter. It has been found preferable for this purpose to utilize a resin which can be cured into a water insoluble resin by heating, since a controlled heating of the graphite has been found to reduce the resistance of the graphite impregnated wicking, and to produce a product having a resistance substantially within the range desired.

A useful class of the water soluble resins, capable of being cured into insoluble products by heating, are the polymethylol derivatives of organic compounds containing at least two amino or amide groups and at least three hydrogen atoms attached to the said groups. Suitable resins of this type are dimethylolurea, dimethylolthiourea, dimethylolguanidine, tetramethylolmelamine, dimethyloladipamide, trimethyloldiethylenetriamine, and the di-, tri-, tetra-, and higher methylol derivatives containing a plurality of amino or amide groups with at least a single active hydrogen substituent.

A preferred class of water soluble resins, which are capable of being cross-linked by heating are polymethylol derivatives of compounds which contain reactive amino groups, for example the various methylol derivatives of the amino triazines, such as: melamine, chlorinated melamine, alkylated melamine, acylated melamine, phenylated melamine, deaminated melamine, ammeline, ammelide, 2,4,6-triethyltriamino-1,3,5 - triazine; 2,4,6-triphenyltriamino - 1,3,5 - triazine; melam; melem; 2-amino-1,3,5-triazine; 2-chloro-4,6-diamino-1,3,5-triazine; 2,4-amino - 6 - hydroxyl-1,3,5-triazine; 6 - methyl-2,4-diamino - 1,3,5 - triazine.

The optimum class of resins useful in the practice of the invention are the methylolmelamines which may contain up to six methylol substituents, for example hexamethylolmelamines, dimethylolmelamine, any of the methylolmelamines having between two and six methylol groups, the alkyl ethers of the methylolmelamines which have one or more of the various methylol groups etherified with an alkyl group, such as the diethyl ether of hexamethylolmelamine, the tetrabutyl ether of tetramethylolmelamine, the diethyl ether of hexamethylolmelamine, the other alkyl ethers of the various polymethylolmelamines, and mixtures of two or more of the various polymethylolmelamines, and/or alkyl ethers of the polymethylolmelamines.

Satisfactory proportions of graphite dispersion and resin solids have been found to range from about 2 parts of graphite to 1 to 4 parts of resin, preferred results having been obtained where about equal parts by weight were used, the variation in proportion resulting in producing some change in the resistance or conductivity of the fabric as may be desired for different conditions. Likewise the relationship of the amount of fabric to the total carbon and resin solids is significant, the best results having been obtained in the range of about 1 to 10% total solids based on the weight of the fabric, with a preferred percentage being about 2 to 3% graphite and resin solids on the weight of the fabric. The use of a catalyst is desirable in producing the desired curing action. The catalyst for curing the methylol compounds used in the practice of this invention may be any acidic substance. The methylol compounds are generally stable in alkaline solutions, and especially in solutions in which the pH ranges from eight to nine. Any substance which reduces the pH to below eight and especially to a point less than a pH of seven will induce curing. Although a wide variety of strongly acid substances will cause the curing of the resin, preferred products are prepared by using mildly acidic catalysts which induce a slower curing process. As is conventional in the curing of methylol urea and methylol melamine resin, salts having an acidic reaction are most useful, for example zinc chloride, various ammonium phosphates, ammonium thiocyanate, and other metal or ammonium salts of strong or moderately strong acids. A useful class of acid salts are the amine salts prepared by reaction of an acid with an amine, thus, the amine salts of phosphoric acid are unusually effective in catalyzing the curing of the water soluble methylol resins. In general the curing of the described resins in acid solution is well known in the art.

The following is a specific example of a composition and method of preparation which have been found to give highly satisfactory results:

| | Per cent |
|---|---|
| Graphite dispersion (Acheson aquadag) | 15 |
| Resin binder comprising a methyl ether of a methylolmelamine | 10 |
| Catalyst comprising a buffer salt of phosphoric acid | 0.5 |
| Santomerse S wetting agent comprising a 30% aqueous solution of sodium decylbenzene sulfonate | 0.1 |
| Water | 74.4 |

The graphite dispersion, the resin, wetting agent and catalyst are first mixed and the water then added, the solution being newly mixed every 8 hours. Cotton wicking is passed through this mixture at room temperature and then cured at about 325° F. for one hour. The resin is thereby converted to a water insoluble state and acts to hold the graphite particles to the cotton wicking so that they will not leach out, such curing or setting of the plastic bonding agent causing the changes in the molecular structure which reduce the noise level. Wicking so prepared has been found to give substantially improved results in the dissipation of objectionable static over a considerably prolonged period of time.

The invention therefore provides a simple, economic, and highly effective method and product, making it possible to produce static wick dischargers which are of uniform controlled resistance and charge dissipating characteristics, and which are essentially resistant to the severe effects encountered during use. Even under the extreme conditions of wide fluctuation in temperature, and severe whipping and other abrading conditions that occur in high speed flight, the wicking essentially retains the desired characteristics and provides effective static charge dissipation thereby reducing or preventing interference with radio and electronic equipment on the aircraft.

While the process and product herein described constitute preferred embodiments of the invention, it is to be understood that the invention is not limited to this precise process and product, and that changes may be made therein without departing from the scope of the invention which is defined in the appended claims.

What is claimed is:

1. A static wick discharger having predetermined resistance characteristics capable of being maintained under exposure to the relative wind on an aircraft in flight comprising fabric wicking in which substantially the entire wicking is impregnated with a dispersion of colloidal graphite, the graphite being bonded to the wicking by a water insoluble resin providing a wear resisting static charge conductor of maintained resistance characteristics under exposure in use.

2. A static wick discharger as defined in claim 1 in which the water insoluble resin is prepared by heat curing a water soluble resin.

3. In combination with an aircraft, a static wick discharger having predetermined resistance characteristics capable of being maintained under exposure to the relative wind on an aircraft in flight comprising cotton wicking in which substantially the entire wicking carries finely divided graphite and a water insoluble binder prepared by heat curing a water soluble resin, said binder retaining the graphite in position upon the wicking as a static dissipating high resistance conductive coating thereon.

4. In combination with an aircraft, a static wick discharger having predetermined resistance characteristics capable of being maintained under exposure to the relative wind on an aircraft in flight comprising cotton wicking in which substantially the entire wicking carries finely divided graphite in the proportion of two parts and a water insoluble binder prepared by heat curing a water soluble resin in the proportion of from about 1 to 4 parts, said binder retaining the graphite in position upon the wicking as a static dissipating high resistance conductive coating thereon.

5. A static wick discharger as defined in claim 1 in which the bonding material includes a binder comprising cured polymethylol derivatives of organic compounds containing at least two radicals of the class consisting of amine and amide groups and at least three hydrogen atoms attached to said groups.

6. A static wick discharger as defined in claim 1 in which the bonding material includes a binder comprising cured polymethylol derivatives of organic compounds containing at least two radicals of the class consisting of amine and amide groups and at least three hydrogen atoms attached to said groups, said binder being rendered water insoluble by heat treatment.

7. A static wick discharger having predetermined resistance characteristics capable of being maintained under exposure to the relative wind on an aircraft in flight comprising fabric wicking impregnated with a mixture including approximately equal parts by weight of aquadag and a water soluble resin comprising cured polymethylol derivatives of organic compounds containing at least two radicals of the class consisting of amine and amide groups and at least three hydrogen atoms attached to said groups.

8. A static wick discharger having predetermined resistance characteristics capable of being maintained under exposure to the relative wind on an aircraft in flight comprising fabric wicking impregnated with a mixture including approximately equal parts by weight of aquadag and a water soluble resin including cured polymethylol derivatives of organic compounds containing at least two radicals of the class consisting of amine and amide groups and at least three hydrogen atoms attached to said groups, said resin being rendered insoluble by heating.

MARY R. SULLIVAN.
FRANCES RUDY HOUK,
*Administratrix W. W. A. of the estate of George W. Houk, deceased.*
NELSON S. TALBOTT,
*Administrator W. W. A. of the estate of George W. Houk, deceased.*

REFERENCES CITED

The following references are of record in the file of this patent:

UNITED STATES PATENTS

| Number | Name | Date |
|---|---|---|
| 1,910,391 | Howard | May 23, 1933 |
| 2,093,651 | Widmer | Sept. 21, 1937 |
| 2,302,003 | Cadwell | Nov. 17, 1942 |
| 2,309,584 | George | Jan. 26, 1943 |
| 2,386,095 | Edgar | Oct. 2, 1945 |
| 2,466,311 | Hall | Apr. 5, 1949 |
| 2,495,199 | Podolsky | Jan. 17, 1950 |

FOREIGN PATENTS

| Number | Country | Date |
|---|---|---|
| 547,481 | Great Britain | Aug. 28, 1942 |
| 576,631 | Great Britain | Apr. 12, 1946 |

OTHER REFERENCES

Electrostatic Dischargers for Aircraft, an article published in the Journal of Applied Physics, vol. 18, August 1947, pages 759 to 765.